Sept. 18, 1962     W. E. FRITZ ETAL     3,054,426
ROTARY MAGNETIC ACTUATOR
Filed Dec. 15, 1958     2 Sheets-Sheet 1
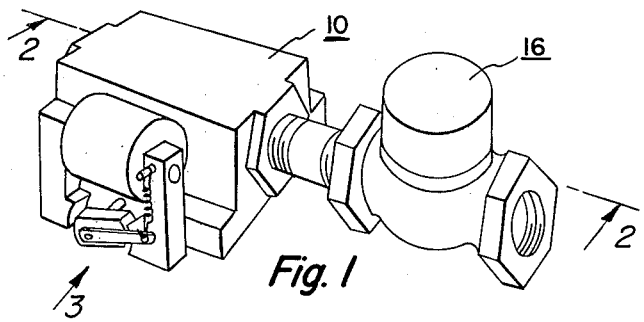
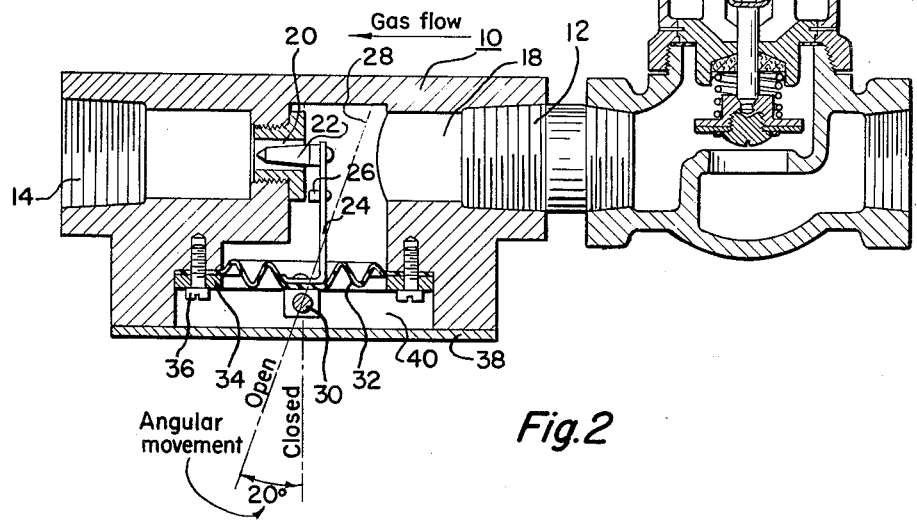
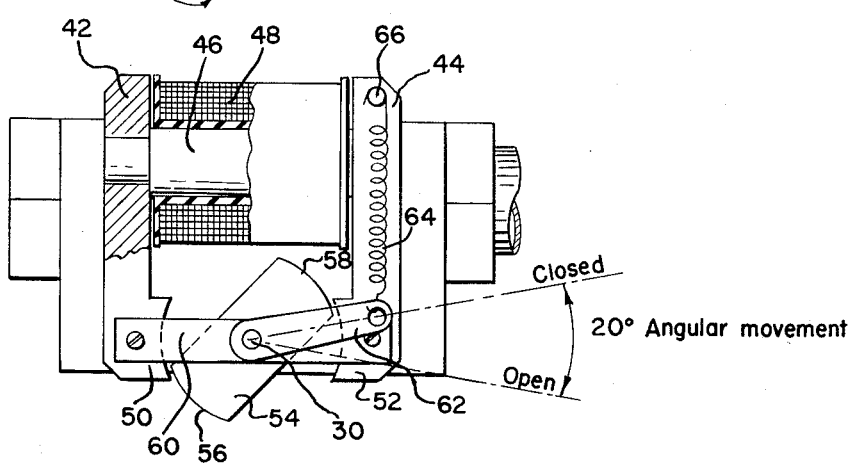
INVENTORS.
William E. Fritz
Donald W. Laviana
BY
*W. E. Fisher*
Their Attorney INVENTORS.
William E. Fritz
Donald W. Laviana Their Attorney

United States Patent Office 3,054,426
Patented Sept. 18, 1962

3,054,426
ROTARY MAGNETIC ACTUATOR
William E. Fritz, Rochester, and Donald W. Laviana, Pittsford, N.Y., assignors to General Motors Corporation, Detroit, Mich., a corporation of Delaware
Filed Dec. 15, 1958, Ser. No. 780,614
4 Claims. (Cl. 138—46)

This invention pertains to electromagnetic actuators, and particularly to a rotary type proportional electromagnet assembly for actuating a valve.

Heretofore, modulating type automatic temperature controls systems for use with gas furnaces have been designed wherein the furnace is controlled so as to supply heat at a rate equal to the heat losses of the enclosure. A system of this general type is disclosed in copending application Serial No. 662,468, filed May 29, 1957, now Patent Number 2,949,237, in the name of Andres C. de Wilde and assigned to the assignee of the present invention. This type of system includes a temperature sensing element, an amplifier, and a variable flow gas valve, the electrical output from the temperature sensing element being proportional to the deviation of the enclosure temperature from a preselected temperature. This electrical output is amplified to the power level required to operate the valve. The valve, in turn, controls the furnace output so as to maintain the selected temperature within the enclosure.

The present invention relates to a proportional type rotary actuator for operating a gas valve so as to control the flow of gas at a rate proportional to the rate of heat loss of the enclosure in which the temperature is being controlled. Accordingly, among our objects are the provision of a rotary type electromagnet having a substantially linear torque versus deflection curve; the further provision of a proportional type electromagnetic actuator having low friction characteristics; and the still further provision of a valve assembly including a rotary electromagnetic actuator.

The aforementioned and other objects are accomplished in the present invention by utilizing magnetic parts having a relatively low magnetic hysteresis and by positively limiting angular movement of the rotary magnet. Specifically, the electromagnetic actuator comprises an armature of magnetic material which is attached to a bearing mounted spindle and is formed with arcuate end surfaces. The electromagnet comprises a core which supports a coil, the core being attached to a pair of pole shoes having arcuate pole surfaces so as to define an arcuate air gap between the pole faces and the armature. The armature shaft has a crank arm attached thereto, the outer end of which is connected to one end of an extension spring. The other end of the extension spring is attached to one of the pole shoes.

When the coil is deenergized, the spring positions the armature so that it is aligned with the poles of the electromagnet. Within the predetermined limits of angular movement of the armature, the torque versus deflection curve is substantially linear. The frictional resistance opposing angular movement of the armature is appreciably smaller than the frictional resistance opposing movement in a linear type solenoid assembly.

When the rotary electromagnetic actuator is used to operate a variable flow gas valve, a valve actuating crank arm is attached to the armature shaft. An elastomeric diaphragm is disposed between the armature and the lever whereby the bearings and electrical parts are not exposed to the gas. The variable flow gas valve includes a valve needle which is attached to the valve actuating crank arm, suitable stops being incorporated to positively limit movement of the armature. In addition, the valve assembly includes a solenoid operated shutoff valve, since the rotary electromagnetic actuator only controls modulation of gas flow within predetermined limits as determined by the type of burner. In the disclosed embodiment, when the valve needle is moved to its low limit of modulation, in other words a minimum gas flow, the energizing circuit for the shutoff solenoid valve is opened so that gas flow is entirely shut off.

Further objects and advantages of the present invention will be apparent from the following description, reference being had to the accompanying drawings, wherein a preferred embodiment is clearly shown.

In the drawings:

FIGURE 1 is a perspective view of a variable flow valve assembly embodying the rotary magnetic actuator of the present invention.

FIGURE 2 is a longitudinal sectional view taken along line 2—2 of FIGURE 1.

FIGURE 3 is a view, partly in section and partly in elevation, taken generally in the direction of the arrow 3 of FIGURE 1.

Figure 4:
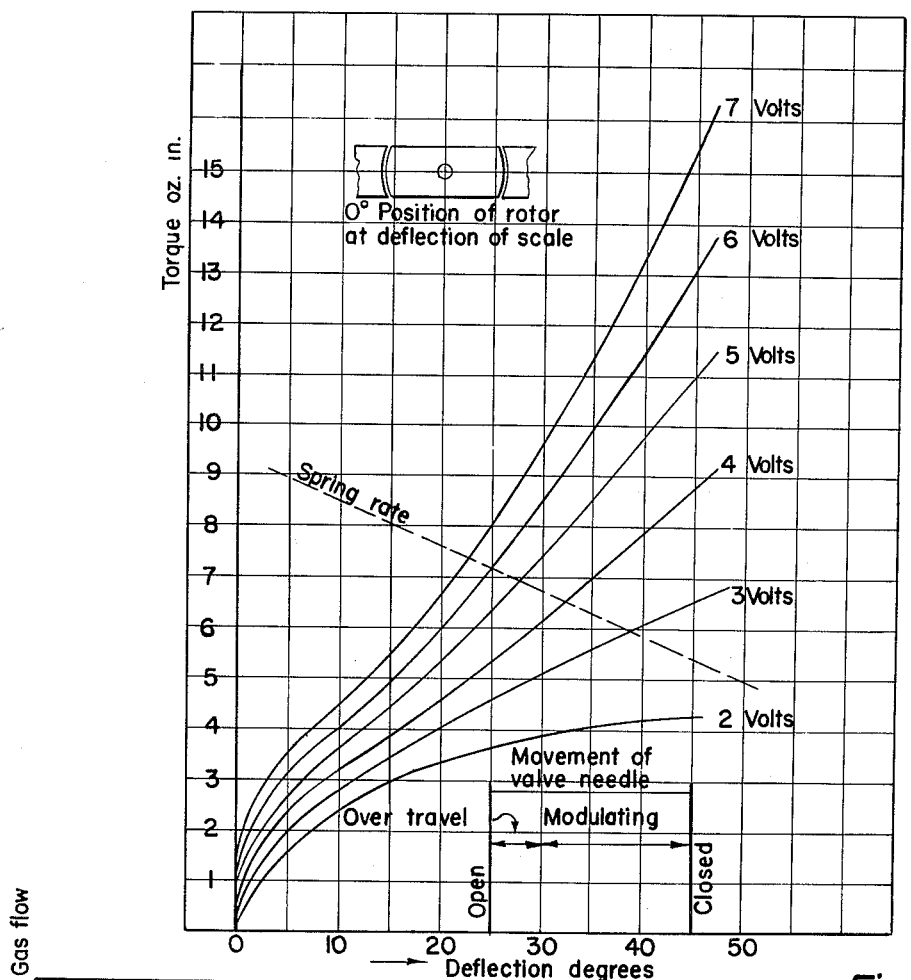
FIGURE 4 is a graph depicting the torque versus deflection curves for the electromagnetic actuator.

With particular reference to FIGURES 1 and 2, the variable flow gas valve assembly includes a valve 10 having an internally threaded inlet 12 and an internally threaded outlet 14. A solenoid operated shutoff valve 16, movable only between the fully open and fully closed positions, controls the flow of gas to the inlet 12 and the passage 18 of the variable flow gas valve.

The variable flow gas valve includes a metering orifice 20, the area of which is controlled by a tapered valve needle 22. The tapered valve needle is attached to the outer end of a crank arm 24 having a stop 26 engageable with the flanged end of the orifice 20 and determining the minimum opening of the orifice member 20. It is well recognized that in gas furnaces having inshot type burners, the gas flow cannot be reduced below about 35% full rated flow to support safe combustion. Accordingly, the valve needle 20 is capable of modulating gas flow from the inlet passage 18 to the outlet 14 only between 35% and 100% of rated gas flow to the burner.

When the temperature control system for the modulating valve requires a gas flow less than 35% rated flow, the shutoff valve 16 is deenergized to interrupt the flow of gas to the burner. The operation of the solenoid operated shutoff valve which is of conventional construction and constitutes no part of this invention, may be controlled by a switch, not shown, actuated by the rotary magnetic actuator to be described.

The full open position of the valve needle 22 is indicated by the line 28, and in the closed position the crank arm stop 26 abuts the orifice member 20. The crank arm 24 is attached to a spindle 30 that is bearing supported in a manner to be described. A suitable elastomeric diaphragm 32 is interposed between the crank arm 24 and the spindle 30 so as to prevent the escape of gas from the valve body 10 and to shield the electromagnetic actuator from exposure to the gas. The diaphragm 32 is held in assembled relation with the valve body by an annulus 34 attached to the body by a plurality of screws 36. An actuator cover 38 is suitably attached to the valve body, diaphragm chamber 40 being formed between the cover 38 and the diaphragm 32.

With reference to FIGURE 3, the rotary electromagnetic actuator includes a pair of pole pieces 42 and 44 which support a core 46 carrying a coil 48. The pole pieces 42 and 44 terminate in arcuate pole shoes 50 and 52 respectively, the pole shoes being composed of sintered iron powder. An armature 54 having arcuate ends 56 and 58 is attached to the spindle 30 and is spaced from the pole shoes 50 and 52 so as to define arcuate air gaps of uniform width. The axis of the spindle 30 coincides with both the center of the arcuate armature ends and the arcuate pole shoes. The armature 54 is likewise composed of sintered iron powder, the sintered iron powder parts being annealed to obtain better magnetic properties. One end of the spindle 30 is bearing supported in a bracket 60. The bracket 60 is suitably attached to the pole pieces 42 and 44. The other end of the spindle is rotatably supported in the valve body 10. A second crank arm 62 is attached to the spindle 30, one end of an extension spring 64 being attached to the outer end of the crank arm 62. The other end of the extension spring 64 is attached to a stud 66 carried by the pole piece 44.

When the valve needle 22 is in the minimum open position, as seen in FIGURE 2, the arcuate ends 56 and 58 at the armature are 45° out of alignment with the pole shoes 50 and 52. In the instant rotary electromagnetic actuator, a substantially linear torque versus deflection curve is obtained with a 20° angular movement of the armature 54. The rate of the extension spring 64 is indicated by the dotted line in the graph of FIGURE 4. The 20° angular movement of the armature 54 is between 45° and 25° as shown in the graph.

As apparent from the graph of FIGURE 4, the entire range of gas flow modulation occurs within the armature positions of 45° to 30°, movement of the armature between 30° and 25° constituting over-travel of the valve needle. It is likewise apparent that the coil 48 must be energized with a voltage of more than 2.5 volts to be at a position other than the minimum opening position shown in FIGURE 1. As the voltage applied to coil 48 increases, the armature 54 and the valve needle 22 are deflected in a substantially linear manner so that the flow of gas is substantially proportional to the applied voltage. At a potential of 4.5 volts, the needle valve is fully open, and an increase in the applied voltage merely results in over-travel of the valve needle.

Figure 5:
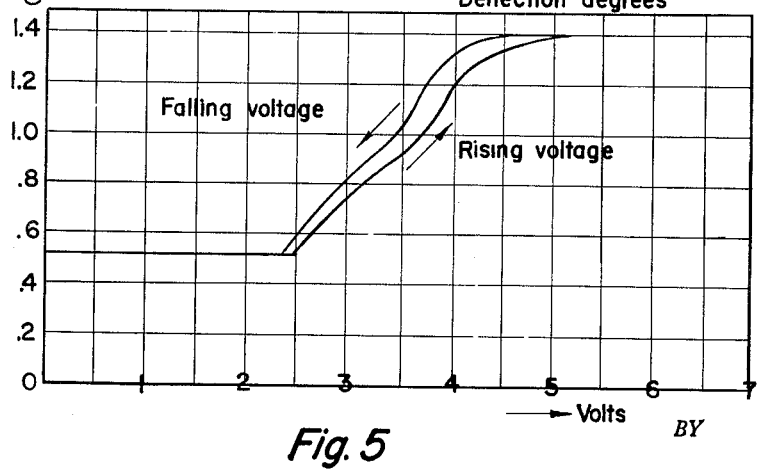
FIGURE 5 is a graph depicting gas flow versus the energizing potential of the electromagnetic actuator.

With reference to the graph of FIGURE 5, a hysteresis curve for the electromagnetic actuator and the valve is graphically depicted. The hysteresis curve represents the total of magnetic hysteresis in the magnetic parts and also the mechanical hysteresis due to friction in the bearing support of the spindle 30 and the diaphragm which is flexed during armature movement. It is likewise apparent from the graph of FIGURE 5 that the differential gas flow with rising and falling applied voltages to the coil 48 is within acceptable limits.

While the embodiment of the invention as herein disclosed constitutes a preferred form, it is to be understood that other forms might be adopted.

What is claimed is as follows:

1. A variable flow valve assembly including, a valve body having an inlet and an outlet, a metering orifice, disposed within said body between said inlet and said outlet, a valve needle for controlling the opening of said orifice, a spindle rotatably supported in said valve body, a crank arm attached to said spindle and carrying said valve needle, an armature attached to said spindle and having arcuate end portions, a pair of pole pieces supported by said valve body having arcuate pole shoes such that an arcuate air gap is defined between said pole shoes and said armature, a coil for magnetizing said pole pieces, and resilient means for opposing angular movement of said armature such that the position of said valve needle is substantially proportional to the voltage applied to said coil.

2. A variable flow valve assembly including, a valve body having an inlet and an outlet, a metering orifice disposed within said valve body between said inlet and said outlet, a valve needle for controlling the opening of said orifice, a spindle rotatably supported in said valve body, a crank arm attached to said spindle and carrying said valve needle, an elastomeric diaphragm attached to said valve body for dividing said valve body into two chambers, said valve needle being disposed in one chamber and said spindle being disposed in the other chamber, a pair of pole pieces supported by said valve body having arcuate pole shoes, an armature disposed outside of said other chamber and attached to said spindle, said armature having arcuate end portions so as to define an arcuate air gap between said armature and said pole shoes, a coil for magnetizing said pole pieces, and resilient means opposing angular movement of said armature such that the position of said valve needle is substantially proportional to the voltage applied to said coil.

3. The valve assembly set forth in claim 2 wherein said spindle has a second crank arm attached thereto and wherein said resilient means comprises a spring, one end of which is attached to said second crank arm and the other end of which is attached to one of said pole pieces.

4. A variable flow valve assembly including, a valve body having an inlet and an outlet, a member disposed within said valve body between said inlet and said outlet and having a metering orifice, a valve needle for controlling the opening of said orifice, a spindle rotatably supported in said valve body, a crank arm attached to said spindle and carrying said valve needle, a stop attached to said crank arm and engageable with said member to determine the minimum opening of said orifice, a pair of pole pieces supported by said valve body having arcuate pole shoes, a coil for magnetizing said pole pieces, an armature attached to said spindle and disposed between said pole shoes, said armature having arcuate end portions so as to define an arcuate air gap between the pole shoes and the armature, and resilient means for opposing angular movement of said armature such that the position of said valve needle is substantially proportional to the voltage applied to said coil.

References Cited in the file of this patent

UNITED STATES PATENTS

| 1,768,979 | Guettinger | July 1, 1930 |
| 2,213,663 | Berard | Sept. 3, 1940 |
| 2,338,909 | Eichhorn | Jan. 11, 1944 |
| 2,511,114 | Lavery | June 13, 1950 |
| 2,662,547 | Cameau | Dec. 15, 1953 |
| 2,671,863 | Mathews | Mar. 9, 1954 |
| 2,675,508 | Ray | Apr. 13, 1954 |
| 2,687,870 | Mathews | Aug. 31, 1954 |
| 2,886,065 | Hershman | May 12, 1959 |
| 2,899,980 | Loebel et al. | Aug. 18, 1959 |

FOREIGN PATENTS

| 886,821 | France | July 19, 1943 |
| 887,341 | France | Aug. 9, 1943 |
| 926,924 | Germany | Apr. 25, 1955 |
| 1,035,747 | France | Apr. 22, 1953 |